United States Patent [19]

Ohsaki et al.

[11] Patent Number: 5,601,164
[45] Date of Patent: Feb. 11, 1997

[54] DEVICE USING ELECTRORHEOLOGICAL FLUID

[75] Inventors: Toshiyuki Ohsaki; Satoru Kawamata, both of Tokyo, Japan

[73] Assignee: Bridgestone Corporation, Tokyo, Japan

[21] Appl. No.: 338,082

[22] Filed: Nov. 9, 1994

[30] Foreign Application Priority Data

Nov. 11, 1993 [JP] Japan ................... 5-282606

[51] Int. Cl.$^6$ ................... F16F 9/42; F16F 9/53
[52] U.S. Cl. ................... 188/274; 188/267; 188/276; 188/264 CC; 267/140.14; 267/64.28
[58] Field of Search ................... 267/140.14, 140.15, 267/140.4, 64.21, 64.22, 64.28; 188/267, 276, 299, 322.5, 264 R, 264 D, 264 CC, 296, 274 OR

[56] References Cited

U.S. PATENT DOCUMENTS

| | | | |
|---|---|---|---|
| 2,956,647 | 10/1960 | Bartholomäus | 188/274 |
| 4,616,810 | 10/1986 | Richardson et al. | 188/274 X |
| 4,861,006 | 8/1989 | Takano et al. | 267/140.14 |
| 4,973,031 | 11/1990 | Takano et al. | 188/267 X |
| 5,054,587 | 10/1991 | Matsui et al. | 188/267 |
| 5,094,328 | 3/1992 | Palmer | 188/274 X |
| 5,180,145 | 1/1993 | Watanabe et al. | 267/64.24 |
| 5,259,487 | 11/1993 | Petek | 188/267 |

FOREIGN PATENT DOCUMENTS

| | | | |
|---|---|---|---|
| 478273 | 4/1992 | European Pat. Off. | 188/267 |
| 3265720 | 11/1991 | Japan . | |
| 1569183 | 6/1980 | United Kingdom | 188/274 |
| 9209823 | 6/1992 | WIPO | 188/274 |

*Primary Examiner*—Josie Ballato
*Attorney, Agent, or Firm*—Sughrue, Mion, Zinn, Macpeak & Seas

[57] ABSTRACT

A device using an electrorheological fluid filled in a fluid enclosing space comprises passages or fins for cooling the electrorheological fluid disposed around the fluid enclosing space and is useful for a vibration damper, a clutch, an engine mount, a shock absorber and the like. The power consumption can be maintained at a sufficiently low level and thermal runaway of electric current can effectively be prevented.

2 Claims, 4 Drawing Sheets

FIG._4
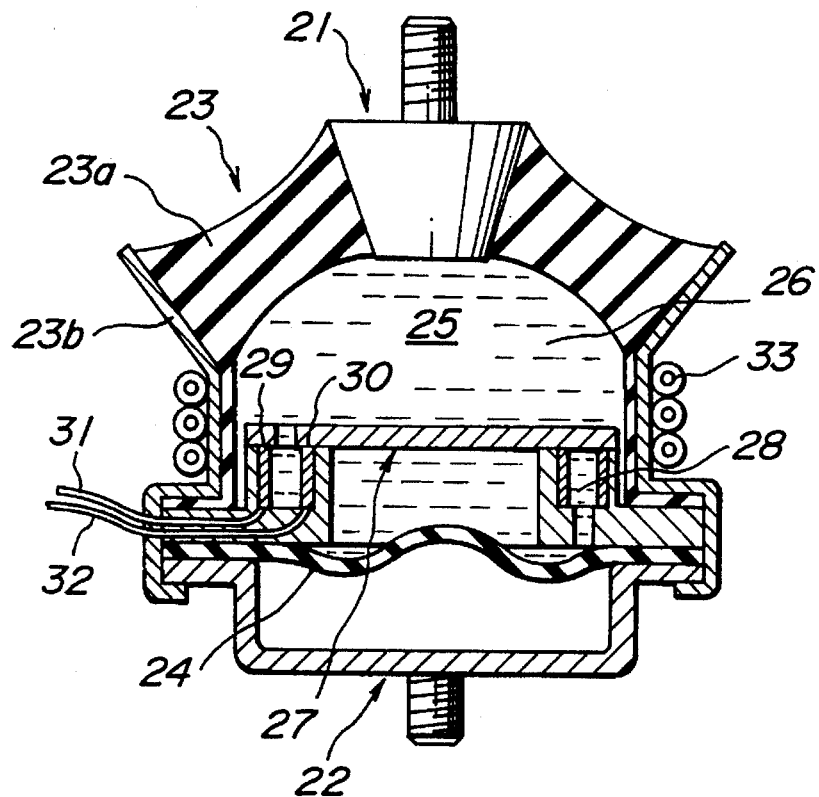
FIG._5
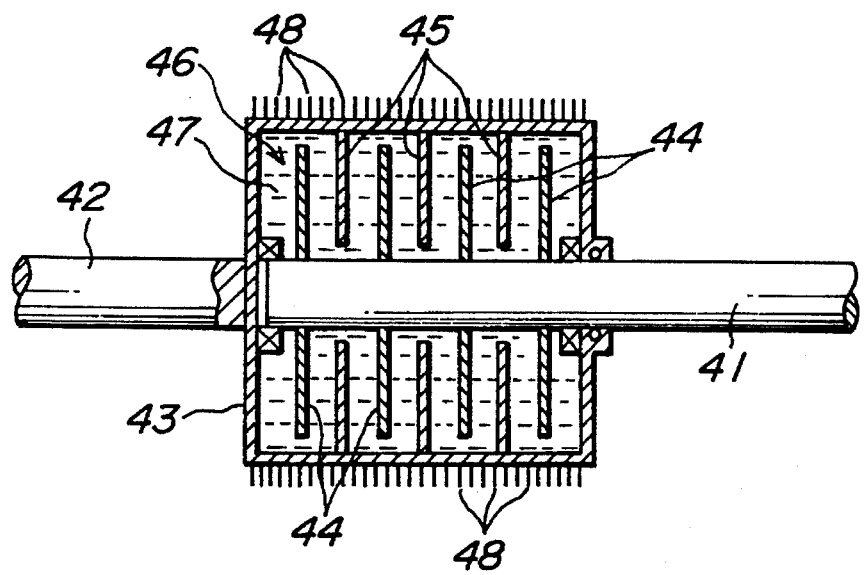

5,601,164

DEVICE USING ELECTRORHEOLOGICAL FLUID

BACKGROUND OF THE INVENTION

1. Field of the Invention

This invention relates to a device using an electrorheological fluid (hereinafter abbreviated as ER fluid simply) such as an ER fluid-filled engine mount, ER fluid-filled vibration damper, ER fluid-filled clutch, ER fluid-filled shock absorber, ER fluid-filled tension controller, ER fluid-filled composite material and the like, which are proposed in various industrial fields. More particularly this invention relates to a device using the ER fluid capable of sufficiently controlling power consumption and effectively preventing thermal runaway of electric current.

2. Description of the Related Art

An ER fluid reversibly and instantaneously generates a viscosity change in accordance with a value of a voltage applied. In this case, the voltage applied is high (generally several kV/mm), while the current density is very low (generally several $\mu A$—several tens $\mu A/cm^2$), so that the power consumption required for controlling the viscosity of the ER fluid is small. Therefore, the application of the ER fluid to various control devices is actively forwarded.

In conventional devices using the ER fluid, the ER fluid is filled in a fluid enclosing space, while relative displacing passages of the ER fluid are defined in the fluid enclosing space and electrodes are disposed on the relative displacing passages.

For example, when the device having the above structure is considered as for use as a vibration damper, the viscosity of the ER fluid and hence the flow resistance of the ER fluid through the relative displacing passage can be changed in accordance with the voltage applied between the electrodes. As a result, the vibration damping force of the damper can properly be changed in accordance with frequency and amplitude of vibrations transmitted by adjusting the value of the voltage applied. Similar results are obtained in the other kind of the device.

In an conventional devices using an ER fluid, a low power consumption is maintained in a short time after the start of control, but a phenomenon of gradually increasing the power consumption is observed, and in extreme cases the control becomes impossible because the power consumption exceeds a capacity of a power source for the control.

That is, the electric current is passed to the ER fluid for controlling the viscosity of the ER fluid, so that Joule heat is created in the device. Furthermore, heat is generated by viscous flowing of the ER fluid. As the sum of these heat quantities exceeds the heat dissipating quantity of the device, the temperature inside the device gradually rises. As a result, there is caused a vicious circle that the rising of the temperature increases the current density and then the increase of the current density brings about a further rising of the temperature inside the device. In the worst case, thermal runaway of electric current (current density×electrode area) is caused.

SUMMARY OF THE INVENTION

It is, therefore, an object of the invention to solve the aforementioned problems of the conventional technique and to provide a device using an electrorheological fluid capable of enhancing the heat dissipation efficiency of the device to always maintain power consumption at a small value and surely preventing thermal runaway of electric current.

According to the invention, there is the provision of in a device using an electrotheological fluid comprising a fluid enclosing space, an electrorheological fluid filled in the fluid enclosing space, a relative displacing passage for the electrorheological fluid and electrodes arranged on the relative displacing passage, an improvement wherein means for cooling the electrorheological fluid such as water jacket positioned around the fluid enclosing space and heat dissipating material circulating in the water jacket or, heat dissipating fins or the like is disposed around the fluid enclosing space.

In the device according to the invention, the cooling means is actuated to cool the fluid enclosing space under a properly selected cooling efficiency, whereby the storage of Joule heat and other heat in the device is effectively prevented. As a result, the ER fluid can be maintained at an initial temperature or a sufficiently lower temperature, whereby the current density is always approximately constant to control the power consumption at low level and completely remove a fear of causing thermal runaway of electric current.

BRIEF DESCRIPTION OF THE DRAWINGS

The invention will be described with reference to the accompanying drawings, wherein:

FIG. 4 is a diagrammatically longitudinal section view of an engine mount as another embodiment of the invention; and FIG. 5 is a diagrammatically longitudinal section view of a clutch as another embodiment of the invention.

DESCRIPTION OF THE PREFERRED EMBODIMENTS

Figure 1:
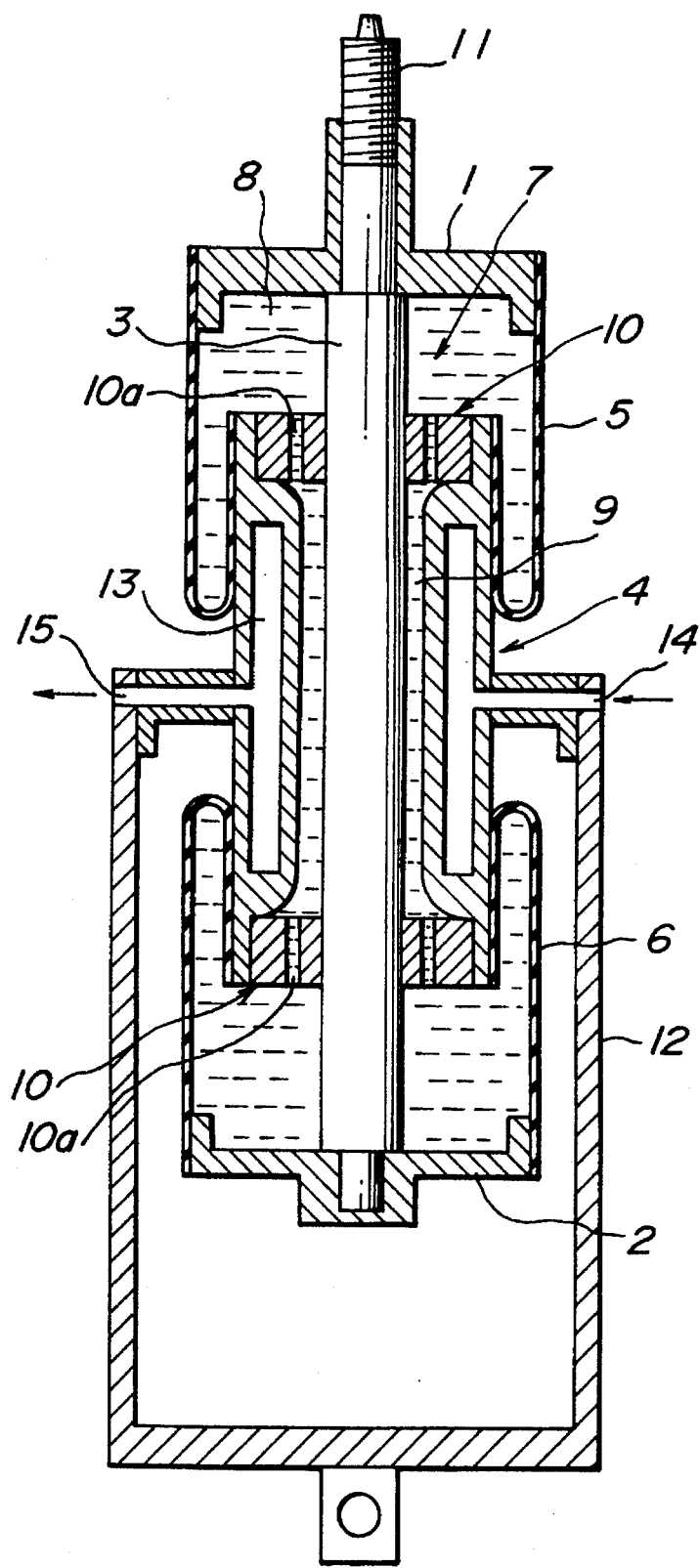
FIG. 1 is a diagrammatically longitudinal section view of a vibration damper as an embodiment of the invention.

In FIG. 1 is sectionally shown an embodiment of the vibration damper according to the invention.

In the vibration damper, an upper face plate 1 and a lower face plate 2 are attached to a rigid rod 3 at a given interval in the longitudinal direction of the rod so as to be parallel with each other, while a cylindrical member 4 is arranged around the rigid rod 3 between both the face plates 1, 2 at a given distance apart from the face plate. Further, the upper and lower end portions of the cylindrical member 4 are liquid-tightly connected to the respective upper and lower face plates 1, 2 through rubber sleeves 5, 6 to define a closed liquid chamber 7.

The closed liquid chamber 7 is filled an ER fluid 8, e.g. ER fluid consisting of 40% by weight of carbonaceous powder and 60% by weight of silicone oil (10 cP) and developing an electrorheological effect, under a pressure of 3 $kgf/cm^2$. Moreover, a restricted passage 9 is formed as a relative displacing passage between the rigid rod 3 and the cylindrical member 4.

In order to apply a voltage to the ER fluid 8, the rigid rod 3 itself serves as a positive electrode and the cylindrical member 4 itself serves as a negative electrode, or the polarities of the rigid rod and the cylindrical member are made opposite to the above case. As a result, a special arrangement of electrodes inside the restricted passage is useless.

In FIG. 1, numeral 10 is a sliding guide member fixed to an inner peripheral surface of each end portion of the cylindrical member 4. These sliding guide members 10 function to smooth relative motion of the rigid rod 3 to the cylindrical member 4 in an axial direction thereof. Each of the sliding guide members 10 is provided with a through-hole 10a having a cross-section area larger than an effective cross-section area of the restricted passage 9. Moreover, numeral 11 and identify a 12 fastening member and a housing of the vibration damper, respectively.

Figure 2:
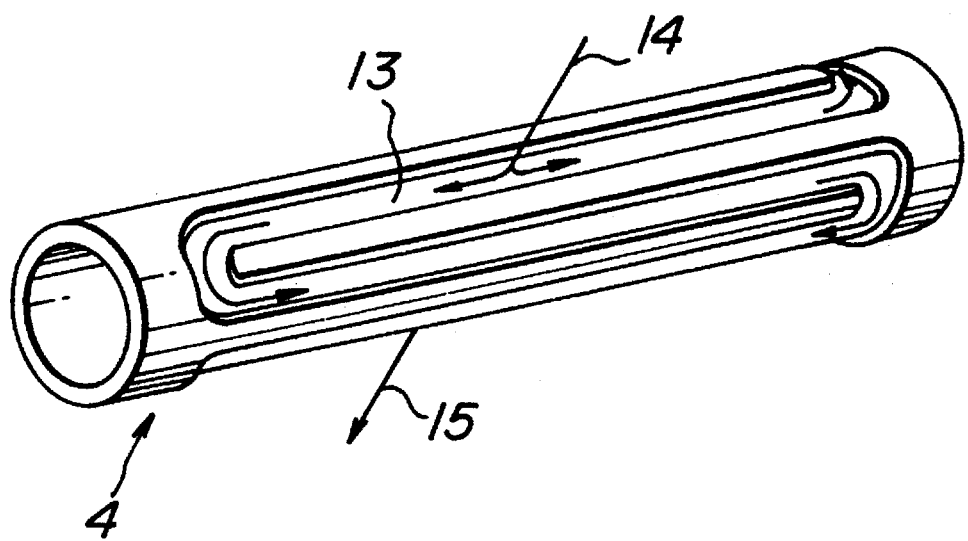
FIG. 2 is a sectionally perspective view of a passage for a refrigerant used in the device shown in FIG. 1.

In the invention, a passage 13 for a refrigerant is formed inside the cylindrical member 4 at a position surrounding the restricted passage 9 and inlet 14 and outlet 15 for the refrigerant are arranged on the cylindrical member 4 at opposite positions. As sectionally and perspectively shown in FIG. 2, the refrigerant passage 13 may be an endless passage largely winding around each end portion of the cylindrical member 4 and continuously extending in the circumferential direction thereof. In this case, a refrigerant such as water or the like flows into the endless passage from the inlet 14, is branched inside the endless passage, and flows in opposite directions to cool the cylindrical member 4 and hence the ER fluid and then discharged from the outlet 15 located opposite to the inlet 14 in the radial direction.

According to the vibration damper having the above structure, vibration energy can effectively be damped by applying a given voltage between the rigid rod 3 and the cylindrical member 4 serving as electrodes to adjust the viscosity of the ER fluid flowing through the restricted passage 9 resulting from the relative motion of the rigid rod 3 to the cylindrical member 4.

After the above vibration damper is set onto a dynamic spring testing machine, when vibrations are applied at a frequency of 2 Hz and an amplitude of ±40 mm and a voltage of 9 kV (3 kV/mm) is applied between electrodes each having a surface area of 80 cm$^2$ (distance between electrodes: 3 mm), Joule heat and viscous heat generation are theoretically calculated to be 43 watt (Joule/s) and 227 watt, respectively.

Figure 3:
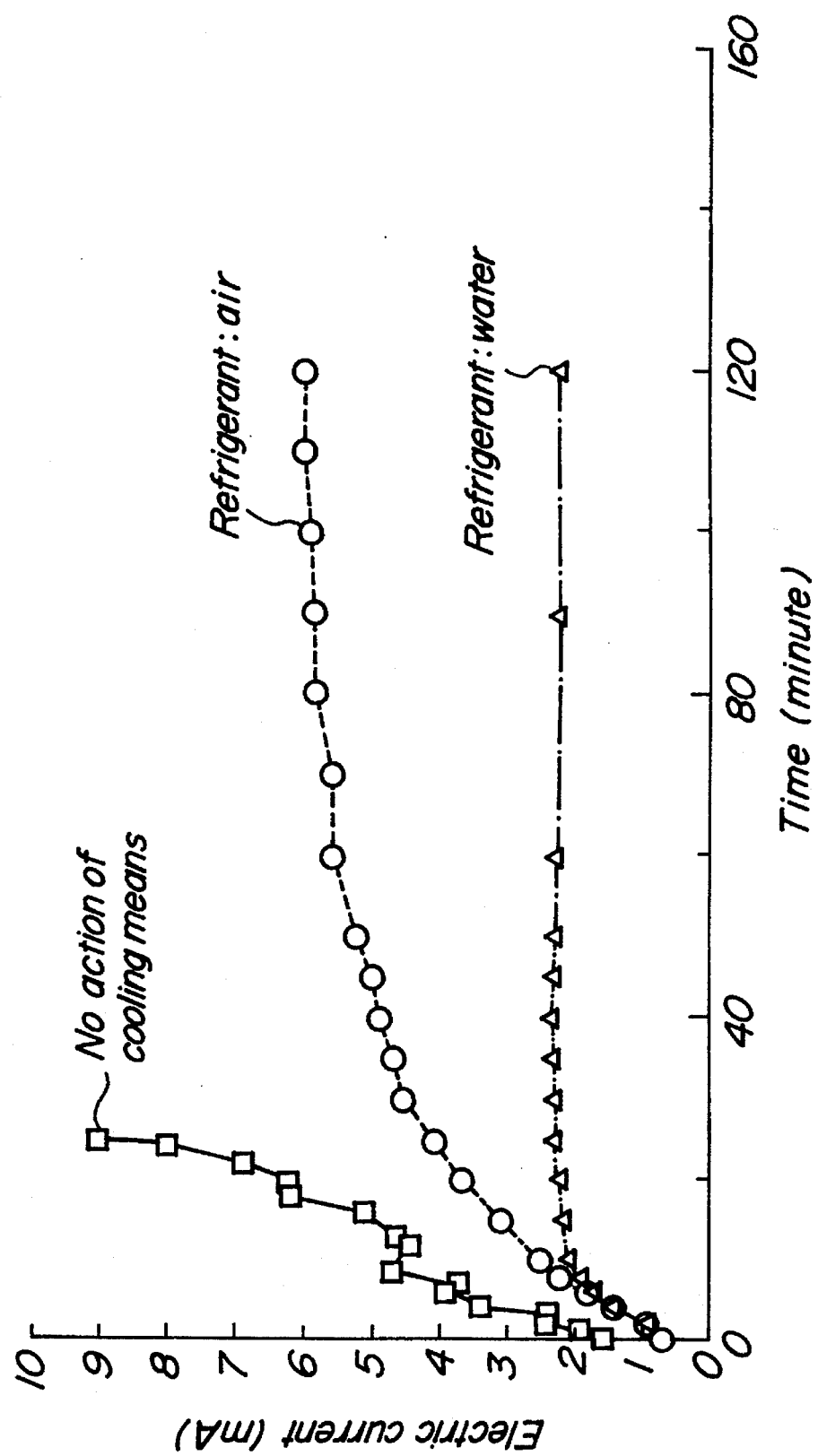
FIG. 3 is a graph showing a change of current value over time.

In this case, a change of electric current with respect to a controlling time is shown in FIG. 3 when the cooling means comprising the refrigerant passage 13 and the refrigerant is not acted, or when the cooling is conducted by using air (30 l/min) or water (0.8 l/min) as a refrigerant. As seen from FIG. 3, the occurrence of thermal runaway of electric current can sufficiently be prevented and the power consumption can be maintained at a low level with use of the cooling means. On the other hand, when the cooling means is not used, thermal runaway of electric current is caused in about 25 minutes and the control becomes impossible.

In FIG. 4 is sectionally shown an embodiment of the engine mount according to the invention, wherein numeral 21 is an upper support member, numeral 22 a lower base member, and numeral 23 an elastic block liquid-tightly connecting the support member and the base member to each other.

The elastic block 23 comprises an elastic member 23a integrally united with the support member 21 and a cylindrical member 23b integrally united with the elastic member 23a and attached to a flange portion of the base member 22 through caulking work or the like. As shown in FIG. 4, the elastic block 23 contributes to the formation of a closed liquid chamber 25 together with a diaphragm 24 clamped at its peripheral edge portion between the cylindrical member 23b and the base member 22. Into the thus formed closed liquid chamber 25 is filled an ER fluid 26 in the same manner as in the aforementioned embodiment.

In the interior of the closed liquid chamber 25 is disposed a passage member 27 liquid-tightly sandwiched at its peripheral edge portion between the diaphragm 24 and the cylindrical member 23b, whereby the closed liquid chamber 25 is divided into two compartments. On the other hand, the two compartments communicate with each other through a restricted passage 28 formed in the passage member 27. Moreover, the restricted passage 28 is extended on a horizontal plane in an accurate form, in which one of end portions of the restricted passage 28 is opened to an upper-side compartment and the other end portion thereof is opened to a lower-side compartment.

Furthermore, positive and negative electrodes 29, 30 are arranged in the restricted passage 28 to extend along side walls of the restricted passage and are connected to power source and control circuit (not shown) through leads 31, 32, respectively.

Moreover, a passage 33 for a refrigerant is arranged outside the cylindrical member 23b of the elastic block 23, particularly a uniform diameter portion of the cylindrical member 23b so as to helically extend around the outer periphery of the cylindrical member 23b. A refrigerant such as water, anti-freeze, oil or the like can be passed through the refrigerant passage 33.

In such an engine mount, a sufficient vibration damping force can be developed by applying a given voltage between the electrodes 29 and 30 when the ER fluid 26 flows from one of the compartments through the restricted passage 28 to the other compartment. On the other hand, the storage of Joule heat resulting from the control of the viscosity of the ER fluid 26 and friction heat resulting from the viscous flowing of the ER fluid 26 in the device can effectively be prevented by flowing the refrigerant into the refrigerant passage 33 to cool the ER fluid 26.

Even in the illustrated embodiment, therefore, thermal runaway of electric current can surely be prevented and also the power consumption can sufficiently be reduced.

After the engine mount containing the ER fluid 26 filled under a pressure of 1.0 kgf/cm$^2$ is set on a dynamic spring testing machine, electric current is measured with the lapse of time by applying vibrations at a frequency of 5 Hz and amplitude of ±1 mm and applying a voltage of 6 kV (3 kV/mm) between the electrodes 29, 30 each having a surface area of 30 cm$^2$ (distance between electrodes: 2 mm). As a result, the electric current reaches to a constant value within 1 hour when the ER fluid is cooled by using water (0.5 l/min) as a refrigerant, or when the cooling is not conducted. That is, the current value in the former case is 0.6 mA and that in the latter case is 2.0 mA, so that the electric current with water cooling becomes about ⅓ as compared with the electric current in case of conducting no cooling.

In FIG. 5 is sectionally shown an embodiment of the clutch according to the invention. Numeral 41 is an input shaft, numeral 42 an output shaft, and numeral 43 a liquid-tight casing secured to the output shaft 42 and rotating together with output shaft 42.

In this case, a top portion of the input shaft 41 is inserted into the liquid-tight casing 43 and journaled therein to be rotatably supported by casing 43. Furthermore, a plurality of annular plates 44 are secured onto the top portion of the input shaft 41 located inside the liquid-tight casing 43 at a given interval in the axial direction of the input shaft. A plurality of annular plates 45 are secured onto the inner peripheral surface of the liquid-tight casing at a given interval in the axial direction and located between the mutual annular plates 44 and become substantially parallel with the annular plates 44. Moreover, an ER fluid 47 is filled in a closed liquid chamber 46 defined by the liquid-tight casing 43.

Thus, a gap between the annular plates 44 and 45 forms a relative displacing passage. And also, the annular plates 44 and 45 are acted as positive and negative electrodes, respectively, so that a voltage is applied to the ER fluid 47 without arranging any special electrodes.

Moreover, a plurality of heat dissipating fins 48 as a cooling means for the ER fluid 47 are disposed on an outer peripheral surface of the liquid-tight casing 43 so as to protrude outward in the radial direction of the casing.

According to the clutch of the above structure, a torque transmitted from the input shaft 41 to the output shaft 42 may be selected to a given value by controlling the voltage applied between the annular plates 44 and 45 to adjust the viscosity of the ER fluid 47. On the other hand, heat generated in the device by torque control or voltage for the control of the ER fluid can sufficiently be discharged through the heat dissipating fins 48 toward exterior.

In the illustrated clutch containing the ER fluid filled under a pressure of 1.0 kgf/cm$^2$, a change of electric current is measured by rotating each of the input shaft 41 and the output shaft 42 at 200 rpm when the loading of the output shaft is zero and applying a voltage of 3 kV between the annular plates 44 and 45 as an electrode having a total surface area of 400 cm$^2$ (distance between electrodes: 1 mm) when total surface area of heat dissipating fins 48 is 120 cm$^2$. As a result, the electric current reaches a constant value of 6 mA in 1 hour. On the other hand, when the same test is carried out with respect to the clutch having no heat dissipating fins, the electric current reaches to a constant value of 9 mA in 1 hour. In the device according to the invention, therefore, the value of electric current can be reduced to ⅔ of that of the conventional device under an action of the heat dissipating fins 48.

As seen from the above, according to the invention, the power consumption can be maintained at a sufficiently low level and thermal runaway of electric current can surely be prevented in the various devices using the electrotheological fluid under the action of the cooling means for the electrotheological fluid irrespective of the service time thereof.

What is claimed is:

1. A device using an electrorheological fluid comprising; a fluid enclosing space, an electrorheological fluid in the fluid enclosing space, a restrictive passage for the electrorheological fluid and electrodes arranged on the restrictive passage, means for cooling the electrorheological fluid disposed around the fluid enclosing space, wherein said device comprises a vibration damper having an upper face plate and a lower face plate attached to a rigid rod serving as an electrode and each plate separated from each other at a given interval in an axial direction of the rigid rod, a cylindrical member serving as an electrode disposed around the rigid rod spaced from the face plates, rubber sleeves liquid-tightly connecting both end portions of the cylindrical member to both the face plates to deride a closed liquid chamber, said electrorheological fluid in the closed liquid chamber, said restricted passage formed between the rigid rod and the cylindrical member, sliding guide members secured to inner peripheral surfaces of both end portions of the cylindrical member for smoothing relative motion of the rigid rod to the cylindrical member in its axial direction, and said means for cooling comprises a passage for a refrigerant formed in the cylindrical member to surround the restricted passage.

2. The device according to claim 1 wherein said means for cooling the electrorheological fluid comprises a coolant passage formed around said relative displacing passage and a refrigerant circulating in said coolant passage.

\* \* \* \* \*